United States Patent
Kurashina

(10) Patent No.: US 9,283,786 B2
(45) Date of Patent: Mar. 15, 2016

(54) PRINTING APPARATUS AND PRINTING METHOD

(71) Applicant: SEIKO EPSON CORPORATION, Tokyo (JP)

(72) Inventor: Teruki Kurashina, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/788,229

(22) Filed: Jun. 30, 2015

(65) Prior Publication Data

US 2015/0375542 A1  Dec. 31, 2015

(30) Foreign Application Priority Data

Jun. 30, 2014  (JP) .................................. 2014-133746

(51) Int. Cl.
*B41J 29/393* (2006.01)
*B41J 19/20* (2006.01)

(52) U.S. Cl.
CPC ...................................... *B41J 19/202* (2013.01)

(58) Field of Classification Search
CPC ................................ B41J 19/202; B41J 19/26
USPC ....................................................... 347/19, 37
See application file for complete search history.

(56) References Cited

U.S. PATENT DOCUMENTS

2006/0181570 A1* 8/2006 Grosse ..................... B41J 19/20
                                                             347/37
2009/0309904 A1  12/2009 Shibasaki et al.

FOREIGN PATENT DOCUMENTS

| JP | 02-060497 A | 2/1990 |
| JP | 06-171073 A | 6/1994 |
| JP | 2008-199707 A | 8/2008 |
| JP | 2011-037109 A | 2/2011 |

OTHER PUBLICATIONS

European Search Report for Application No. 15174607.0 dated Nov. 26, 2015.

* cited by examiner

*Primary Examiner* — Julian Huffman
(74) *Attorney, Agent, or Firm* — Workman Nydegger

(57) ABSTRACT

A printing apparatus includes: a printing unit that performs printing on a printing medium; a drive unit that causes the printing unit to move; a power supply unit that supplies power to the drive unit; a detection unit that detects the movement of the printing unit; and a controller that controls an initialization operation related to the printing unit based on a detection result of the detection unit. When power supply from the power supply unit to the drive unit is started, the controller acquires the detection result obtained when power is not supplied, performs the initialization operation in a case where a movement of the printing unit is detected in the detection result, and does not perform the initialization operation in a case where a movement of the printing unit is not detected in the detection result.

6 Claims, 8 Drawing Sheets

PRINTING APPARATUS AND PRINTING METHOD

CROSS-REFERENCE TO RELATED APPLICATIONS

The entire disclosure of Japanese Patent Application No: 2014-133746, filed Jun. 30, 2014 is expressly incorporated by reference herein in its entirety.

BACKGROUND

1. Technical Field

The present invention relates to a printing apparatus and a printing method.

2. Related Art

In the related art, a printing apparatus that has a "power-saving mode" which is aimed at reducing power consumption is known. The power-saving mode means a state to which the printing apparatus automatically transitions when a power switch of the printing apparatus turns on and no operation (or the like) is performed by a user for a certain period of time. In addition to the power-saving mode, states of the printing apparatus include a state of a "power-off mode" in which the power switch turns off and a state of an "operation mode" in which the power switch turns on and an operation of an operation panel by a user, a printing process, or the like is performed.

The transition to each of the modes causes a start process of each of the modes to be performed. For example, an initialization operation for printing preparation is performed in the start process of the operation mode. JP-A-2011-37109 discloses a printing apparatus in which an initialization operation of an operation mode when transitioning from a power-saving mode is more simply performed than an initialization operation of the operation mode when transitioning from a power-off mode. Accordingly, a power saving effect is further heightened as compared to the related art.

Specifically, JP-A-2011-37109 discloses a control method in which a home-seek operation (which is an initialization operation of a carriage (recording head) position) is omitted in the start process of the operation mode when transitioning from the power-saving mode.

However, should a manual user operation (or the like) cause a carriage to move during the power-saving mode, printing is performed with the carriage position as it was prior to the movement. Therefore, there is concern that the printing may not be performed at an accurate position. Accordingly, there is further a concern that a user might repeatedly turn the power off and on with that aim of preventing printing at the inaccurate location, thereby causing the home-seek operation to be repeatedly performed.

In addition, there is a method in which an existing encoder (which monitors the position of the carriage during the power-saving mode) is operated to detect shifting of the position of the carriage. However, this results in an increase in power consumption during the power-saving mode and thus is inappropriate to realize the method.

SUMMARY

An advantage of some aspects of the invention is to provide a printing apparatus in which power consumption is suppressed during a power-saving mode, and in which it is possible to detect whether or not a carriage is moved and to perform a home-seek operation in a case where the carriage is moved.

The invention can be realized in the following forms or application examples.

APPLICATION EXAMPLE 1

According to this application example, there is provided a printing apparatus including: a printing unit that performs printing on a printing medium; a drive unit that causes the printing unit to move; a power supply unit that supplies power to the drive unit; a detection unit that detects the movement of the printing unit; and a controller that controls an initialization operation related to the printing unit based on a detection result of the detection unit. When power supply is started from the power supply unit to the drive unit, the controller acquires the detection result obtained when power is not supplied thereto, performs the initialization operation should movement of the printing unit be detected in the detection result, and does not perform the initialization operation if movement of the printing unit is not detected in the detection result.

In this case, the detection unit detects whether or not the printing unit moves and the controller acquires the detection result of the detection unit when power is not supplied to the drive unit. For example, the power supply to the drive unit in which power consumption becomes great is cut off in a power-saving mode. That is, the detection unit can detect whether or not the printing unit including a carriage moves in the power-saving mode.

In addition, the controller controls execution of the initialization operation based on the detection result obtained when the power supply is started to the drive unit. In the power-saving mode, the controller can perform control such that a home-seek operation which is the initialization operation is performed in a case where the carriage is moved and such that the home-seek operation is not performed in a case where the carriage is not moved.

Hence, it is possible to provide the printing apparatus in which power consumption is suppressed during a power-saving mode and printing can be performed at an accurate position by detecting whether or not a carriage is moved, and in which the home-seek operation is performed in a case where the carriage is moved.

APPLICATION EXAMPLE 2

In the printing apparatus according to the application example, it is preferable that the drive unit has a motor that causes the printing unit to move, and that the detection unit detects the movement based on an electromotive force generated in the motor.

In this case, the motor that drives the printing unit includes, for example, a coil and a magnet. Based on the law of electromagnetic induction, kinetic energy obtained by the movement of the printing unit is converted into electrical energy. Since the electrical energy is an electromotive force, it is possible to detect the movement of the printing unit by detecting the existence of the electromotive force.

APPLICATION EXAMPLE 3

In the printing apparatus according to the application example, it is preferable that the detection unit has a capacitor that accumulates the electromotive force, and that the detection unit is driven by power supplied from the capacitor.

In this case, the detection unit can be driven by the electromotive force accumulated in the capacitor and can detect the movement of the printing unit. Since the power supplied from the power supply unit is not needed, it is possible to suppress the power consumption to be low even when the printing apparatus is in the power-saving mode.

APPLICATION EXAMPLE 4

According to this application example, there is provided a printing apparatus including: a printing unit that performs printing on a printing medium; a drive unit that causes the printing unit to move; a power supply unit that supplies power to the drive unit; a detection unit that detects a change in the capacitance of the printing unit; and a controller that controls an initialization operation related to the printing unit based on a detection result of the detection unit. When power supply from the power supply unit to the drive unit is started, the controller acquires the detection result obtained when power is not supplied, performs the initialization operation should a change in the capacitance be detected in the detection result, and does not perform the initialization operation if a change in the capacitance is not detected in the detection result.

In this case, the detection unit detects the change in the capacitance of the printing unit, and the controller acquires the detection result of the detection unit which is obtained when power is not supplied to the drive unit. The capacitance of the printing unit including a carriage is changed, for example, by the approach of a finger or another part of the human body. That is, the carriage is more likely to be moved by a human hand when the detection unit detects the change in the capacitance and the carriage is not moved when the detection unit detects no change in the capacitance. The controller performs a home-seek operation (which is the initialization operation of the carriage) in the case where the change in the capacitance is detected, and the home-seek operation is not performed in the case where the change is not detected. Hence, in the case where the carriage is more likely to be moved, the home-seek operation is performed and it is possible to perform the printing at the accurate position. Further, in the case where the carriage is not moved, the home-seek operation is omitted and it is possible to achieve power saving and reduction of processing time.

APPLICATION EXAMPLE 5

According to this application example, there is provided a printing method in which a movement operation of a printing unit that moves and performs printing on a printing medium is controlled, the printing method including: detecting whether an electromotive force is generated in a drive unit so as to cause the printing unit to move or whether capacitance of the printing unit is changed; and performing an initialization operation related to the movement operation of the printing unit should the electromotive force be generated in which case the capacitance is changed, in the detected result, and performing no initialization operation if no electromotive force is generated in which case where the capacitance is not changed, in the detected result.

In this case, should the electromotive force be generated in the drive unit in which case the capacitance of the printing unit is changed, the initialization operation related to the movement operation of the printing unit is performed. In such a case, since the printing unit (including a carriage) is more likely to be moved, a home-seek operation which is the initialization operation of the carriage is performed. Thus, it is possible to perform the printing at an accurate position in the following printing.

In addition, in the case where the electromotive force is not generated in the drive unit in which case the capacitance is not changed, the initialization operation related to the movement operation of the printing unit is omitted. In such a case, since the carriage is not moved, no home-seek operation of the carriage is performed. Thus, it is possible to achieve power saving and reduction of processing time.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings. The following description is provided only for an embodiment of the invention, and the invention is not limited thereto. In the following drawings, in order for the description to be easily understandable, the size in the description is different from an actual size in some cases.

Embodiment 1

Outline of Printing Apparatus

Figure 1:
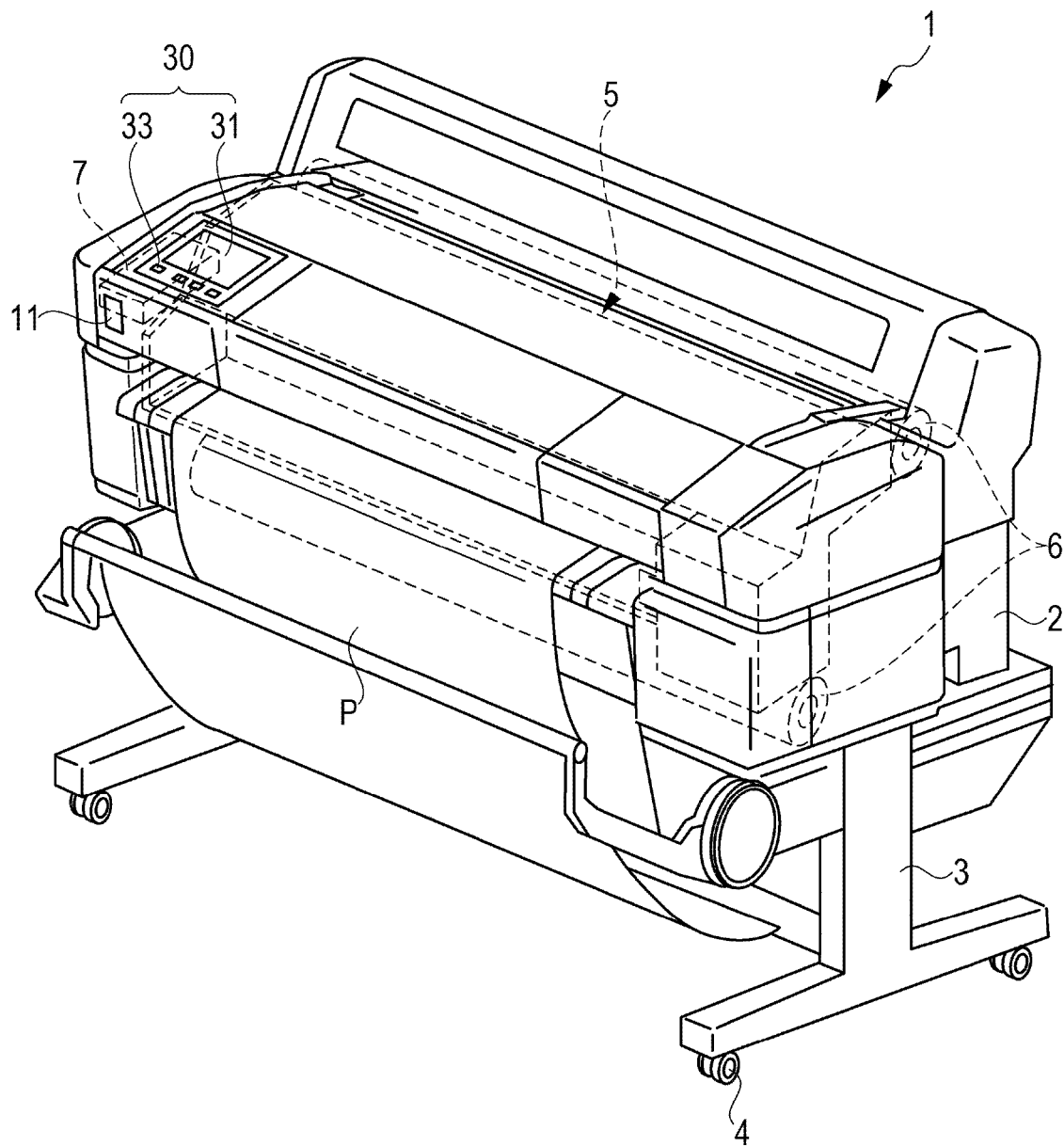
FIG. 1 is a perspective view schematically illustrating the appearance of a printer.

FIG. 1 is a perspective view schematically illustrating the appearance of a printer 1.

For example, the printer 1 corresponds to a printing apparatus and is a large-sized ink jet type printer which is able to perform printing on a printing medium with a relatively large size such as A0 size or B0 size in JIS standards. A paper roll P is an example of the printing medium and is supplied in a state of being wound in a roll shape.

The printer 1 is configured to include an apparatus body 2, a stand 3 that supports the apparatus body 2, or the like.

The apparatus body 2 is configured to include a printing mechanism section 5 which is enclosed in the apparatus body 2, a paper roll removing/supplying unit 6, a power switch 11 which is disposed to be exposed on a housing of a control unit 7 and the apparatus body 2, an operation unit 30, and the like. The printing mechanism section 5 discharges ink onto a surface of the printing medium and prints an image. The paper roll removing/supplying unit 6 feeds the paper roll P to the printing mechanism section 5 and discharges the paper roll after printing is performed. The control unit 7 is configured to include an electronic circuit board which is configured to have an integrated circuit that performs centralized control of the respective units including the printing mechanism section 5 described above and the paper roll removing/supplying unit 6. When the power switch 11 turns on, power (which is converted into a voltage required for driving the respective units) is supplied to the respective units such as the printing mechanism section 5, the paper roll removing/supplying unit 6, and the control unit 7. The operation unit 30 displays setting details or the like on an operation panel 31 through the control by the control unit 7 and an operation signal that is input from an operation button 33 which receives an operation of a user is output to the control unit 7.

In addition, an original image (which is printed by the printing mechanism section 5) is supplied as image data from a personal computer (PC) which is an external apparatus, a server through a network, an external storage medium (all of which are not illustrated), or the like.

The stand 3 includes a plurality of casters 4 on the lower end thereof, which enables the printer 1 to be transported by being moved across a floor.

Outline of Printing Mechanism Section

Figure 2:
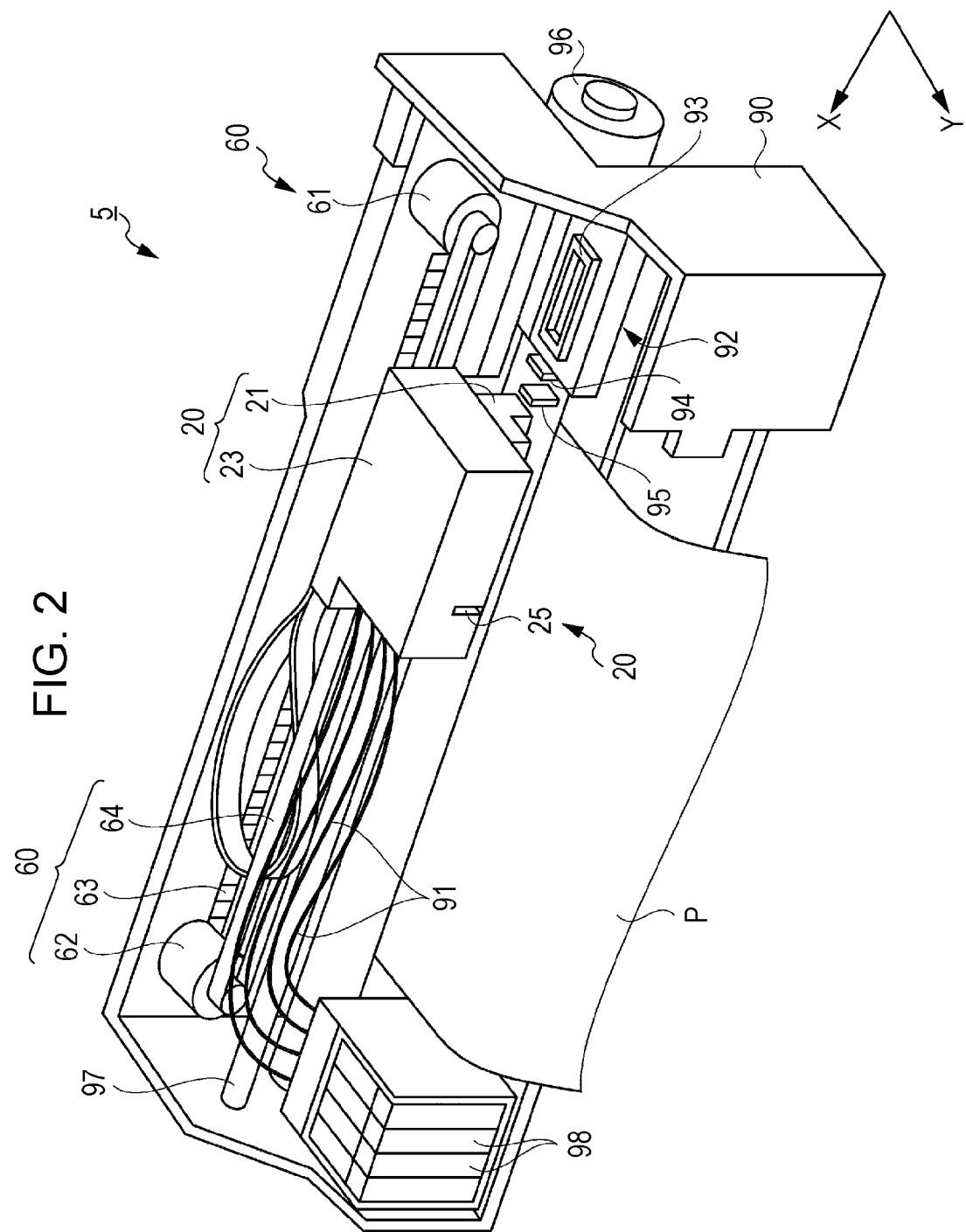
FIG. 2 is a perspective view schematically illustrating a configuration of a printing mechanism section.

FIG. 2 is a perspective view schematically illustrating a configuration of the printing mechanism section 5. The printing mechanism section 5 is configured to include a printing unit 20, a drive unit 60, a frame 90, and each unit disposed in the frame 90.

The frame 90 is a housing of the printing mechanism section 5 and accommodates the drive unit 60 and the printing unit 20. The drive unit 60 is a mechanism which causes the printing unit 20 to reciprocate in a direction (paper width direction) that is orthogonal to a direction in which the paper roll P is sent out. When one direction is orthogonal to the other direction, the direction does not need to be exactly orthogonal to the other direction and may intersect the other direction at an angle which is slightly shifted from a right angle. In addition, the same is true for understanding the term, orthogonal, in the following description. The printing unit 20 reciprocates and discharges the ink which is transported from an ink cartridge 98 through an ink supply tube 91, onto the paper roll P. The paper width direction of the paper roll P, in which direction the printing unit 20 reciprocates, corresponds to a main scanning direction (direction X) and a direction which is orthogonal to the main scanning direction and in which the paper roll P is fed by a paper feeding mechanism 96 corresponds to a sub scanning direction (direction Y).

Hereinafter, the printing unit 20 and the drive unit 60 will be described in detail. In addition, each unit disposed in the frame 90 will also be described therein.

Printing Unit 20 and Home 92

The printing unit 20 is configured to include a head 21 and a carriage 23. The head 21 includes a plurality of rows of nozzles (not illustrated) which opens on the undersurface facing the paper roll P and ejects the ink from the nozzles. The carriage 23, to which the head 21 is fixed, reciprocates in the main scanning direction along a guide rod 97 that is stretched across the frame 90. The carriage 23 moves in the direction X to one paper width end of the paper roll P and moves to a position of a home 92 on one opposite end side at which the head 21 is located.

In the home 92, a cap 93, a wiper 94, a lock lever 95, and the like are provided. The cap 93 covers the head 21 such that moisture is retained therein and the wiper 94 wipes ink which is attached on a nozzle opening surface of the head 21. The lock lever 95 engages with a lock-receiving portion 25 having a groove structure which is formed in the carriage 23, and thereby the head 21 is locked so as not to separate from the home 92. In the printer 1, the printing unit 20 is moved to a position of the home 92 during transition to a power-off mode and during transition from the operation mode to the power-saving mode, and the printing unit is locked by the lock-receiving portion 25 and the lock lever 95. That is, the printing unit 20 is maintained at the position of the home 92 during the power-off mode and the power-saving mode. The lock lever 95 is released during the transition to the operation mode and the printing unit 20 becomes movable.

In addition, the lock lever 95 can be released through a user's manual operation during the power-off mode and the power-saving mode and the user can manually move the printing unit 20 after the lock lever 95 is released.

Drive Unit 60

The drive unit 60 is configured to include a carriage motor 61, a carriage roller 62, a linear encoder 63, a timing belt 64, and the like.

The carriage motor 61 is a direct current (DC) motor or a stepping motor and a motor that is configured to have a coil and a magnet and that is driven by DC power supply. The DC motor may be a known brushed motor which slides using a commutator (brush) which comes into contact with an electrode and in which a current flows or a known brushless motor. The stepping motor may be a known motor that rotates by switching drive currents flowing to a plurality of bipolar type or unipolar type winding wires. The carriage motor 61 is not limited to the DC motor or the stepping motor.

The timing belt 64 is placed across the carriage motor 61 and the carriage roller 62 and a part of the printing unit 20 is latched to the timing belt 64. In addition, the guide rod 97 is a rod-shaped support member stretched in the main scanning direction and supports the printing unit 20 in a reciprocating manner along the axis thereof. When power is supplied to the carriage motor 61 and the shaft of the motor rotates, power is transmitted to the timing belt 64 which then rotates. The printing unit 20 reciprocates in the main scanning direction along the guide rod 97.

The linear encoder 63 includes a linear scale, a detection sensor, and a counter (not illustrated) and detects scale markings of the linear scale which is moved in the main scanning direction (direction X). The position of the printing unit 20 is calculated using the number of scale markings which are counted and the calculated result is output to the main controller 50 (to be described below). In addition, when a home-seek processing unit 55 (to be described below) causes the printing unit 20 to move to the position of the home 92, the counter performs resetting such that the position in the direction X is set to be zero (which means an origin).

Configuration of Printer

Figure 3:
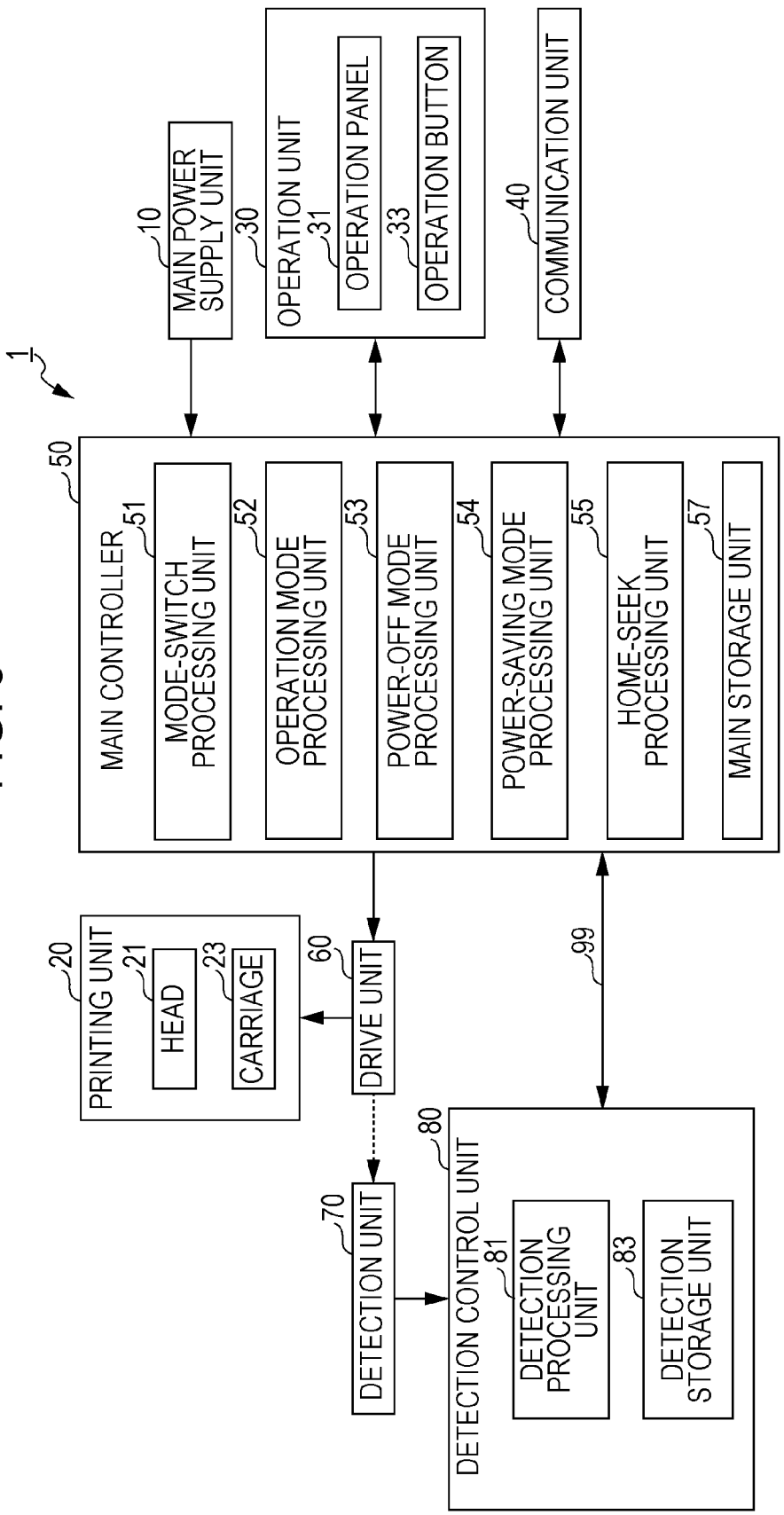
FIG. 3 is a block diagram illustrating a schematic configuration of the printer.

FIG. 3 is a block diagram illustrating a schematic configuration of the printer 1.

The printer 1 is configured to include a main power supply unit 10, the printing unit 20, the operation unit 30, a communication unit 40, the main controller 50, the drive unit 60, the detection unit 70, the detection control unit 80, and the like. In addition, the main controller 50 and the detection control unit 80 are connected through a serial communication 99 which is wired on the electronic circuit board.

The main power supply unit 10 is configured to have a known circuit such as a noise filter circuit, a rectification smoothing circuit, a DC-DC convertor (all not illustrated), converts input AC voltage into DC voltage, and supplies power to each unit of the printer 1. The noise filter circuit is, for example, an electromagnetic compatibility (EMC) filter and cuts off low frequency noise and high frequency noise which are generated from input AC voltage, another connected circuit, or the like. In the rectification smoothing circuit, AC power (from which the low frequency noise and the high frequency noise are removed by the EMC filter) is rectified and smoothed and is converted into DC power. The DC-DC convertor converts the voltage of the DC power into a plurality of stabilized AC voltages which are required by each unit of the printer 1 and supplies the converted voltages to each unit. The DC voltages output from the DC-DC convertor are, for example, from ±42 V or ±24 V for the carriage motor 61 of the drive unit 60 and are supplied to the main controller 50 or the detection control unit 80, to be described below, as a voltage value such as +5 V or +3.3 V.

The main power supply unit 10 corresponds to a power supply unit.

The printing unit 20 is configured to include the head 21 and the carriage 23 described above and is controlled by the main controller 50 to eject the ink from the nozzles and to reciprocate in the main scanning direction. In addition, the printing unit 20 is controlled by the main controller 50 to move to the position of the home 92 during the power-off mode and the power-saving mode.

The operation unit 30 is configured to include the operation panel 31, the operation button 33 which are described above, and the like. The operation panel 31 is configured to have a liquid crystal display (LCD) or the like and a display device that performs various displays based on a display signal input from the main controller 50. In addition, the operation panel 31 has a backlight function for illuminating the LCD from the rear surface and is controlled by the main controller 50 to turn on the backlight during the operation mode and to turn off the backlight during the power-saving mode. Since power is not supplied during the power-off mode, the backlight turns off.

The operation button 33 is an input device which is configured to have a button switch, a touch panel, or the like and outputs a signal from a pressed button or a touched position to the main controller 50. The touch panel is disposed to cover the LCD surface of the operation panel 31 and each pixel of the operation panel 31 which is displayed and a touched position of the touch panel are, in advance, associated with each other by the main controller 50.

The communication unit 40 is a universal serial bus (USB) adapter, a Bluetooth (registered trade mark) adapter, a wireless local area network (LAN) adapter, or the like and is configured to have a communication protocol which is in common with an external apparatus. For example, the communication with the external apparatus (such as a personal computer (PC) or a server) is performed using a USB protocol in the USB adapter, a Bluetooth (registered trade mark) protocol in the Bluetooth (registered trade mark) adapter, and an internet protocol (IP) in the wireless LAN adapter. Accordingly, reception of original image data to be printed or transmission and reception of various commands or other data are performed.

The main controller 50 is configured to have an arithmetic processing unit such as a central processing unit (CPU), a read only memory (ROM), a random access memory (RAM), a nonvolatile random access memory (NVRAM), or an electrically erasable programmable read only memory (EEPROM), a volatile memory, a nonvolatile memory, or the like. In addition, the main controller 50 may be an application specific integrated circuit (ASIC) in which these units or memories are embedded. The main controller 50 controls the units such as the printing unit 20, the operation unit 30, the communication unit 40, the drive unit 60, or the like of the printer 1. Description will be provided below; however, since the detection unit 70 is controlled by the detection control unit 80, the detection unit 70 is not a target of the control by the main controller 50.

The main controller 50 has a mode-switch processing unit 51, an operation mode processing unit 52, a power-off mode processing unit 53, a power-saving mode processing unit 54, a home-seek processing unit 55, a main storage unit 57, or the like as a functional unit. These function units are described only as examples and there is no need to include all of the function units as required configurational elements. In addition, another function unit other than these function units may be included as a required configurational element.

The main controller 50 corresponds to a controller.

The mode-switch processing unit 51 performs a process in which respective states of the power-off mode, the power-saving mode, and the operation mode of the printer 1 are switched. Transition between the states of the printer 1 is performed based on a condition for performing the transition to the respective predetermined states.

Specifically, in a case where the mode-switch processing unit 51 receives off-interruption of the power switch from the main power supply unit 10 during the power-saving mode and the operation mode, a process of the power-off mode processing unit 53 is performed. During the power-off mode, power supplied from the main power supply unit 10 to the respective units including the main controller 50 is cut off. In a case where the power switch is on, power is supplied from the main power supply unit 10 and the main controller 50 starts and the mode-switch processing unit 51 is executed. The mode-switch processing unit 51 (which operates at a timing when the power switch turns on) causes the process of the operation mode processing unit 52 to be performed.

If the mode-switch processing unit 51 receives interruption from a timepiece (not illustrated that indicates that a certain period of time (for example, five minutes) has elapsed since an input operation, image data reception, or the like from the operation unit 30 or the communication unit 40 has not been performed during the operation mode, the process of the power-saving mode processing unit 54 is performed.

In a case where the mode-switch processing unit 51 receives interruption that indicates that an input operation, image data reception, or the like is performed in the operation unit 30 or the communication unit 40 during the power-saving mode, the process of the operation mode processing unit 52 is performed.

Figure 5:
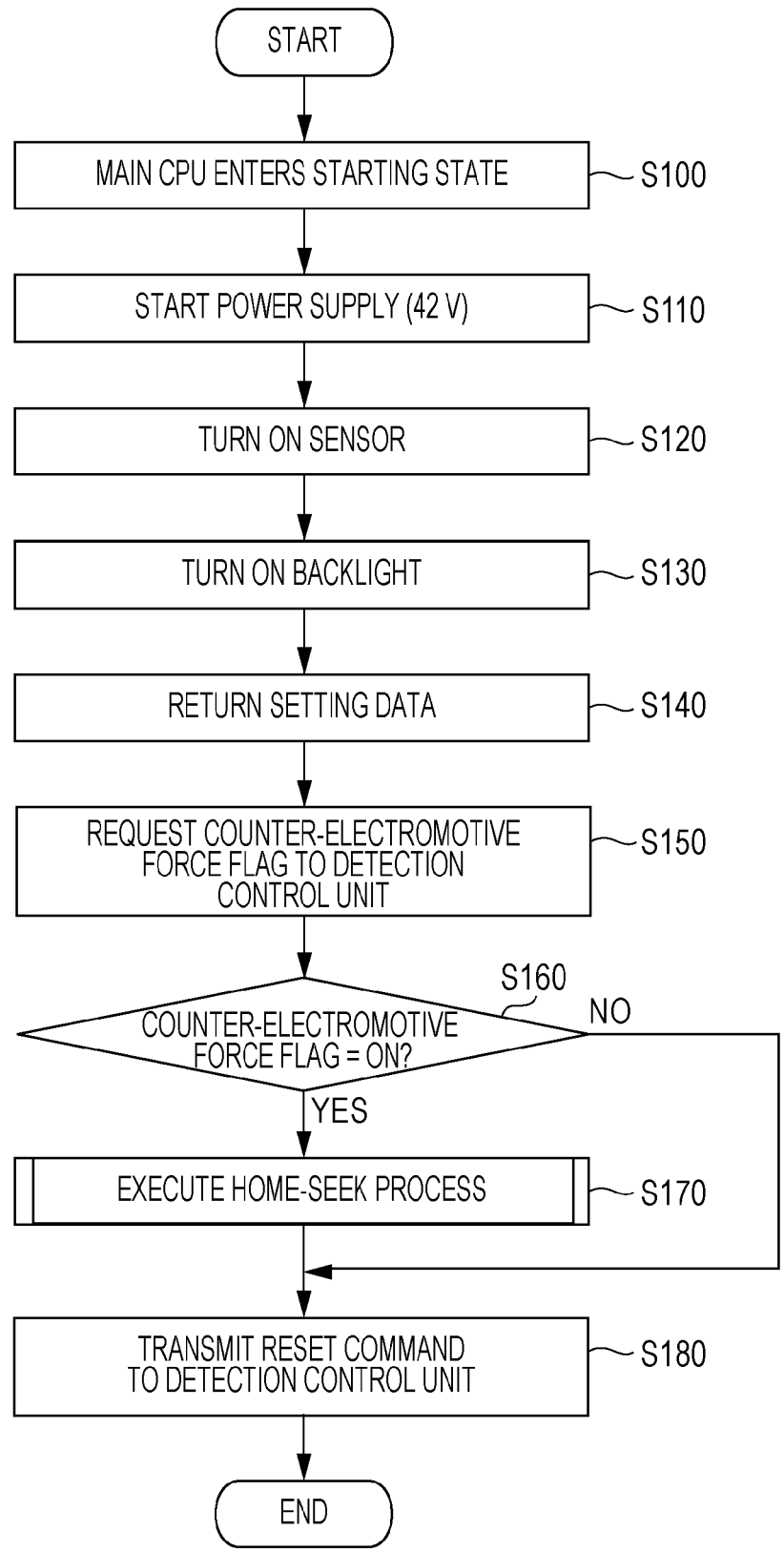
FIG. 5 is a flowchart illustrating a start process flow of an operation mode in a main controller.

The operation mode processing unit 52 is called on by the mode-switch processing unit 51 and switches the mode of the printer 1 to the operation mode. The operation mode processing unit 52 controls the main power supply unit 10 and supplies the required voltage of power to the respective units of the printer 1. Next, the processes of initializing the respective units are performed. A start process of the operation mode processing unit 52 will be described below using a flowchart (FIG. 5). In addition, in order to measure a certain period of time which is a condition for performing the transition to the power-saving mode, a time point at which the latest operation is performed in the operation unit 30 is acquired from the timepiece and is stored in the main storage unit 57.

The power-off mode processing unit 53 receives the off-interruption of the power switch, is called on by the mode-switch processing unit 51, and switches the mode of the printer 1 to the power-off mode. Specifically, the home-seek processing unit 55 (to be described below) is called on and controls the drive unit 60 of the printer 1 such that the printing unit 20 is accommodated at a position of the home 92. In addition, details set in the operation unit 30 are stored in the nonvolatile storage memory of the main storage unit 57. Then, the main power supply unit 10 is controlled and power which is supplied to the respective units of the printer 1 is cut off.

Figure 6:
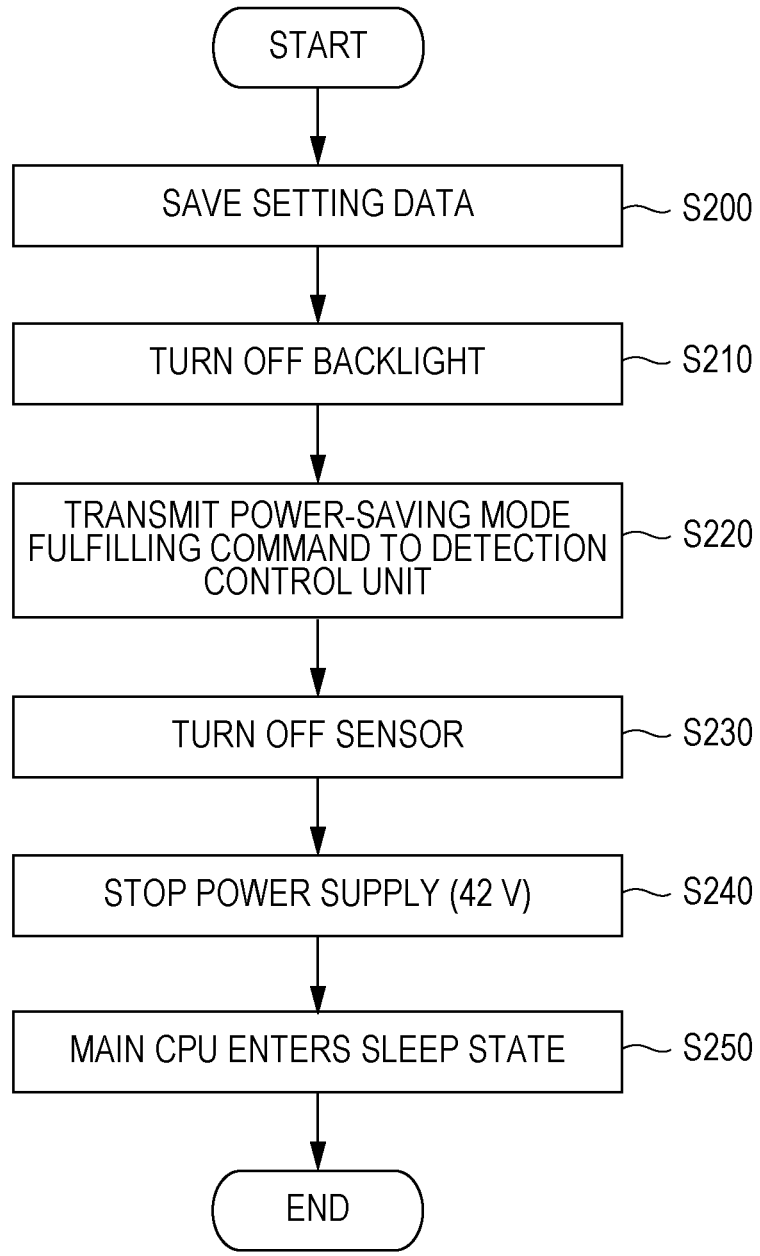
FIG. 6 is a flowchart illustrating a start process flow of a power-saving mode in the main controller.

The power-saving mode processing unit 54 is called on by the mode-switch processing unit 51 and switches the mode of the printer 1 to the power-saving mode. Specifically, the home-seek processing unit 55 is called on and controls the drive unit 60 of the printer 1 such that the printing unit 20 is accommodated at a position of the home 92. In addition, details set in the operation unit 30 are stored in the nonvolatile storage memory of the main storage unit 57. Then, the main power supply unit 10 is controlled, power is supplied to the operation panel 31 of the operation unit 30 and the communication unit 40 that generates an event which is a trigger for returning to the operation mode, to the main controller 50, or the like, and power supply to the other units is cut off. A start process of the power-saving mode processing unit 54 will be described below using a flowchart (FIG. 6). In the power-saving mode processing unit 54, the CPU of the main controller 50 is in a sleep state. Specifically, a processing clock of the CPU is switched to a low-speed clock, the process is limited to detecting the trigger from the operation panel 31 and the communication unit 40 as the minimum necessary process, and thereby, consumption of power supplied to the main controller 50 is suppressed.

The home-seek processing unit 55 is called on by the power-off mode processing unit 53 and the power-saving mode processing unit 54 and controls the drive unit 60 of the printer 1 such that the printing unit 20 is accommodated at a position of the home 92. The home-seek processing unit 55 performs a processing operation which ensures that the printing unit 20 can move from the origin in the main scanning direction (direction X) of the printing unit 20 and can move across the entire traveling path thereof.

Specifically, the processing operation includes a reset operation in which the counter of the linear encoder 63 is reset to zero when the printing unit 20 is positioned at the origin in the direction X and a trial traveling operation for checking that the printing unit 20 can move across the entire traveling path in the direction X without encountering an obstacle. In the reset operation, when the carriage motor 61 is driven such that the printing unit 20 moves in the direction to the home 92, when a current value of power supplied to the carriage motor 61 becomes overcurrent, and it is determined that the current value exceeds a threshold value and reaches the maximum, the counter of the linear encoder 63 is reset to zero. In addition, in the trial traveling operation, the carriage motor 61 is reversely driven such that the printing unit 20 moves in the direction opposite to the home 92 along the guide rod 97, and the printing unit 20 is moved to the position of the home 92 after checking that the printing unit 20 can move across the entire traveling path therebetween without encountering an obstacle.

In addition, when the printing unit 20 is accommodated at the position of the home 92, the wiper 94 performs wiping away of the ink attached on the nozzle opening surface of the head 21 and nozzle cleaning.

A home-seek process and the home-seek operation (which are realized through the operation of the home-seek processing unit 55) correspond to the initialization operation related to the printing unit.

The main storage unit 57 is ROM, RAM, NVRAM, EEPROM, or the like and stores a program which is realized in the respective function units of the main controller 50 or a variable or data used in the program. The NVRAM, the EEPROM, or the like of the main storage unit 57 is a nonvolatile memory and the counter value of the linear encoder 63, various setting values set in the operation unit 30, or the like are stored therein even in a period in which power is not supplied.

The drive unit 60 causes the printing unit 20 including the carriage 23 to travel with the carriage motor 61 described above as a driving force source. During the power-off mode and the power-saving mode, the power supply from the main power supply unit 10 is cut off.

In a case where the power not supplied from the main power supply unit 10 to the carriage motor 61, the detection unit 70 is configured such that a circuit that detects whether the printing unit 20 is moved operates. Specifically, power supply to the carriage motor 61 is cut off during the power-off mode and the power-saving mode. When a user manually moves the printing unit 20, the latched timing belt 64 rotates and the shaft of the carriage motor 61 rotates. The rotation of the shaft causes a counter-electromotive force to be generated in a power input terminal of the carriage motor 61. In this manner, the generated counter-electromotive force is monitored and thereby, the movement of the printing unit 20 is detected. A circuit configuration of the detection unit 70 will be described with reference to FIG. 4.

The detection control unit 80 is configured to have an arithmetic processing unit (such as a micro controller unit (MCU), a ROM, a RAM, an NVRAM, or an EEPROM, a volatile memory, a nonvolatile memory, or the like) which is different from that in the main controller 50. The detection control unit 80 is a low power consumption type microcomputer which can be started through the counter-electromotive force output from the detection unit 70. In addition, a program executed in the detection control unit 80 has fewer steps than those in the main controller 50 and all of the steps can be executed even when power is supplied from the detection unit 70 for a short time. The detection control unit 80 is configured to include the function units such as a detection processing unit 81 and a detection storage unit 83.

The detection control unit 80 corresponds to the drive unit including the detection unit 70.

The detection processing unit 81 detects the counter-electromotive force from the carriage motor 61 and transmits a detection state to the main controller 50. Specifically, it is determined whether or not the printer 1 is in the power-saving mode. Information regarding whether or not the counter-electromotive force is generated during the power-saving mode is stored in the nonvolatile memory of the detection storage unit 83. The detection processing unit 81 transmits and receives a command from the main controller 50 through the serial communication 99. When a request command notifying the result of whether or not the counter-electromotive force is generated is received from the main controller 50, the detection processing unit 81 replies with the result. The process flow of the detection processing unit 81 will be described with reference to FIG. 7.

The detection storage unit 83 is ROM, RAM, NVRAM, EEPROM, or the like and stores a program which is realized in the detection processing unit 81 or a variable or data used in the program. In addition, information regarding whether or not the counter-electromotive force is generated during the power-saving mode is stored in the nonvolatile memory such as NVRAM or EEPROM, and the information is stored therein even when power is not supplied.

The serial communication 99 is a serial communication such as a universal asynchronous receiver transmitter (UART) and transmits and receives data in a readable communication method common to both the main controller 50 and the detection control unit 80. The serial communication 99 may be a serial communication using another communication method or may be parallel communication such as bus communication.

Operating Principle of Circuit of Detection Unit 70

Figure 4:
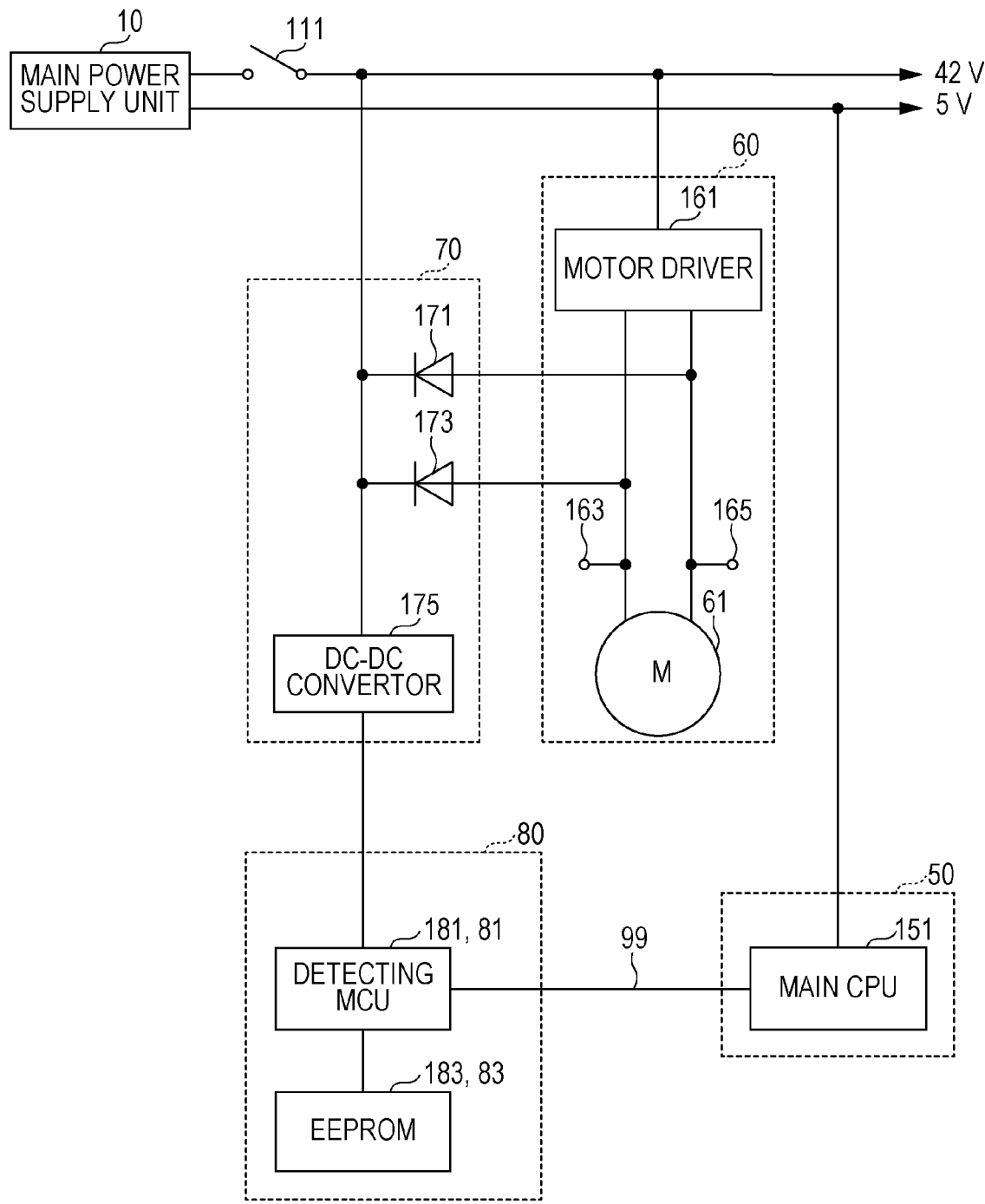
FIG. 4 is a circuit diagram schematically illustrating an example of a detection unit.

FIG. 4 is a circuit diagram schematically illustrating an example of the detection unit 70 in the power-saving mode. In FIG. 4, a part of the circuit which is not directly relevant to the description is not illustrated.

First, an operation principle of the detection unit 70 and a peripheral circuit in the power-saving mode is described with reference to FIG. 4.

The main power supply unit 10 supplies voltages of 42 V and 5 V. A switch 111 turns off in the power-saving mode and thus is open and the supply of the voltage of 42 V is stopped. The voltage of 5 V is a drive voltage of a main CPU 151 which configures the main controller 50. The voltages of 42 V and 5 V output from the main power supply unit 10 are examples; another voltage value may be used, and a voltage value may be used as long as the respective configurational units can be driven at the voltage value.

The drive unit 60 is configured to include the carriage motor 61, the motor driver 161, and the like. The motor driver 161 is an integrated circuit (IC) which switches and controls an amount, a direction, a timing, or the like of current flowing in the carriage motor 61 and controls a rotation speed or a direction of the shaft of the carriage motor 61, pulse width modulation (PWM), or the like.

Since the switch 111 is open, power is not supplied to the motor driver 161 and an operation thereof is not performed. Hence, power is not supplied to the carriage motor 61 from the motor driver 161. In this state, when the printing unit 20 (carriage 23) is moved by the user or the like, the counter-electromotive force is generated in a terminal 163 and a terminal 165 of the carriage motor 61. The generated counter-electromotive force is output to the detection unit 70.

The detection unit 70 is configured to have a diode 171, a diode 173, a DC-DC convertor 175, or the like. The diode 171 and the diode 173 guide the counter-electromotive force output from the drive unit 60, to the DC-DC convertor 175 and prevent the counter-electromotive force from flowing backward. The DC-DC convertor 175 steps down the input counter-electromotive force to an operation power supply voltage of a detecting micro controller unit (MCU) 181 which configures the detection control unit 80 and supplies the reduced voltage to the detection control unit 80.

In the detection control unit 80 in which power supply is started, the detection processing unit 81 is operated when power is transmitted to the detecting MCU 181 and the operation thereof is started. When the detection processing unit 81 is operated, a counter-electromotive force flag which indicates that the counter-electromotive force is generated in an EEPROM 183 which is a nonvolatile memory of the detection storage unit 83 is set. For example, a bit of an identified address in the EEPROM 183 which stores information related to the counter-electromotive force is changed from 0 to 1. The detecting MCU 181 enters a standby state after setting the counter-electromotive force flag and an amount of power of the supplied counter-electromotive force is converged and the operation thereof is ended.

The main controller 50 is configured to have the main CPU 151 or the like. The main CPU 151 during the power-saving mode receives the power supply of the voltage of 5 V from the main power supply unit 10 and operates in the sleep state.

Next, the operation principle of the detection unit 70 and a peripheral circuit in the power-saving mode is described being continued from the description with reference to FIG. 4.

When a transition is performed from the power-saving mode to the operation mode, the main CPU 151 is switched from the sleep state to a normal operation state. At the same time, since the switch 111 turns on and is closed, power is supplied to the detecting MCU 181 from the main power supply unit 10 and the detection processing unit 81 which is retained in the detecting MCU 181 is operated. When the detection processing unit 81 is operated, the process is separated from the case of the power-saving mode and another process is performed. Mainly, transmission and reception of various types of information to and from the main CPU 151 are performed through the serial communication 99.

The serial communication 99 is wired on the electronic circuit board of the control unit 7 (FIG. 1) between the main CPU 151 and the detecting MCU 181. Accordingly, the main CPU 151 and the detecting MCU 181 can perform data transmission and reception between each other using the UART.

When the main CPU 151 is switched from the sleep state to the normal operation state, the operation mode processing unit 52 is operated. The operation mode processing unit 52 transmits a request command which inquires whether or not the counter-electromotive force is generated, from the main CPU 151 through the serial communication 99 to the detecting MCU 181. When the detection processing unit 81 in the detection control unit 80 is operated and the detecting MCU 181 receives the request command, the counter-electromotive force flag is read from the EEPROM 183 and details thereof are transmitted to the main CPU 151.

In this manner, when the transition from the power-saving mode to the operation mode is performed, the main controller 50 inquires whether or not the counter-electromotive force is generated in the detection control unit 80, that is, whether or not the printing unit 20 (carriage 23) is moved due to an external factor, and acquires a result thereof. The main controller 50 can determine whether or not the home-seek process needs to be performed in the start process of the operation mode based on the acquired result.

Process of Main Control Unit

Start Process of Operation Mode

FIG. 5 is a flowchart illustrating a start process flow of an operation mode in the main controller 50. This flow means that the start process flow of the operation mode is performed in the case of the transition from the power-saving mode to the operation mode in the printer 1. The execution of this flow causes the function of the operation mode processing unit 52 to be realized.

In step S100, the main CPU 151 (which is the main controller 50) enters the normal operation state. Specifically, since the main CPU 151 operates in the sleep state during the power-saving mode, the main CPU 151 is switched from the sleep state to the normal operation state in which the main CPU 151 can control the respective units of the printer 1.

In step S110, the power (42 V) supply is performed. Specifically, the main power supply unit 10 is controlled such that the switch 111 turns on and power transmission is performed through a line at 42 V. When the power transmission is performed through the line at 42 V, power is supplied to the drive unit 60, the detection unit 70, the detection control unit 80, or the like.

In step S120, a sensor turns on. Specifically, a detection sensor of the linear encoder 63 including the drive unit 60 is driven and can detect a position of the printing unit 20 during a printing operation.

In step S130, a backlight turns on. Specifically, power is supplied to a backlight panel which is provided in the operation panel 31 and it is possible to visually recognize display content on the LCD in the operation unit 30. In the operation unit 30, an operation related to various settings or printing can be performed.

In step S140, the setting data is returned. Specifically, the counter value of the linear encoder 63 which is stored in a nonvolatile memory area of the main storage unit 57 and various types of data set in the operation unit 30 are read and the setting details are reflected to the respective units. For example, the setting details such as print setting (such as a type of printing sheet or a print quality) or environment setting (such as switching the time to the power-saving mode) are read in a variable or the like of the program used in the main controller 50.

In step S150, details of the counter-electromotive force flag are requested to be sent to the detection control unit 80. Specifically, communication with the detection control unit 80 is established based on a communication protocol of the communication unit 40 and a request command is transmitted such that the details of the counter-electromotive force flag are transmitted to the detection control unit 80.

In step S160, it is determined whether or not the received counter-electromotive force flag is on. Specifically, a reply to the request command transmitted from the detection control unit 80 in step S150 is received. In a case where the received counter-electromotive force flag is on (Yes in step S160), the process proceeds to step S170. In a case where the received counter-electromotive force flag is off (No in step S160), the process proceeds to step S180.

In step S170, the home-seek process is executed. Specifically, the home-seek processing unit 55 described above is operated, and the reset operation and the trial traveling operation are performed.

In step S180, a reset command is transmitted to the detection control unit 80. Specifically, a command for resetting a flag of the detection control unit 80 is transmitted to the detection control unit 80 through the serial communication 99.

In this manner, according to the start process of the operation mode, since the counter-electromotive force flag is on in step S160, which indicates the generation of the counter-electromotive force, it is determined that the printing unit 20 (carriage 23) has moved. Since an actual position of the carriage 23 in the main scanning direction after the movement is not matched with position information in the direction X which is controlled in the main controller 50 in the state in which the printing unit 20 has moved, it is not possible to perform the printing at a correct print position when the printing process is performed in this state. Hence, detection of the movement of the printing unit 20 is performed, the home-seek process is executed, the reset operation is performed. Accordingly, it is possible to perform the printing at the correct print position in the following printing.

Meanwhile, in a case where the counter-electromotive force flag is not on in step S160, it is possible to shorten the processing time of the start process of the operation mode.

For example, in a large-sized ink jet type printer, a traveling time in the main scanning direction is taken. In such a case, a lot of time is taken for the home-seek process including the nozzle cleaning or the like (for example, about one minute). Therefore, when it is determined that the counter-electromotive force flag is off in step S160, it is determined that the printing unit 20 has not moved and it is possible to omit the time-consuming home-seek process. In addition, since the actual position of the printing unit 20 is matched with the position of the counter value of the linear encoder 63 which is read in step S140 (, it is possible to perform the printing at the correct print position even when omitting the home-seek process.

The process proceeds to step S170 and the home-seek process is executed when the counter-electromotive force flag is on in step S160, and the home-seek process is not executed when the counter-electromotive force flag is not on; however, the configuration is not limited thereto. The determination process in step S160 is performed such that the home-seek process is not executed when the counter-electromotive force flag is off and the home-seek process is executed when the counter-electromotive force flag is not off and the same effects as above can be obtained.

Start Process of Power-Saving Mode

FIG. 6 is a flowchart illustrating a start process flow of a power-saving mode in the main controller 50. This flow means that the start process flow of the power-saving mode has initiated. The start process flow is executed in the case of the transition from the operation mode to the power-saving mode in the printer 1. The execution of this flow causes the function of the power-saving mode processing unit 54 to be realized.

In step S200, the setting data is saved. Specifically, the counter value of the linear encoder 63 or the various types of data set in the operation unit 30 are acquired and are stored (saved) in the nonvolatile memory area of the main storage unit 57.

In step S210, the backlight turns off. Specifically, power supply to the backlight panel which is provided in the operation panel 31 is cut off.

In step S220, a command of transition to the power-saving mode is transmitted to the detection control unit 80. Specifically, communication with the detection control unit 80 is established based on the communication protocol of the communication unit 40. Furthermore, a command representing that transition to the power-saving mode is performed is transmitted to the detection control unit 80.

In step S230, the sensor turns off. Specifically, the power supply to the detection sensor of the linear encoder 63 including the drive unit 60 is stopped.

In step S240, the power supply (42 V) is stopped. Specifically, the main power supply unit 10 is controlled such that the switch 111 turns off and the power transmission through the line of 42 V is cut off. When the power transmission through the line of 42 V is cut off, power supply to the drive unit 60, the detection unit 70, the detection control unit 80, or the like is stopped.

In step S250, the main CPU 151 which configures the main controller 50 enters the sleep state.

Process of Detection Control Unit

Figure 7:
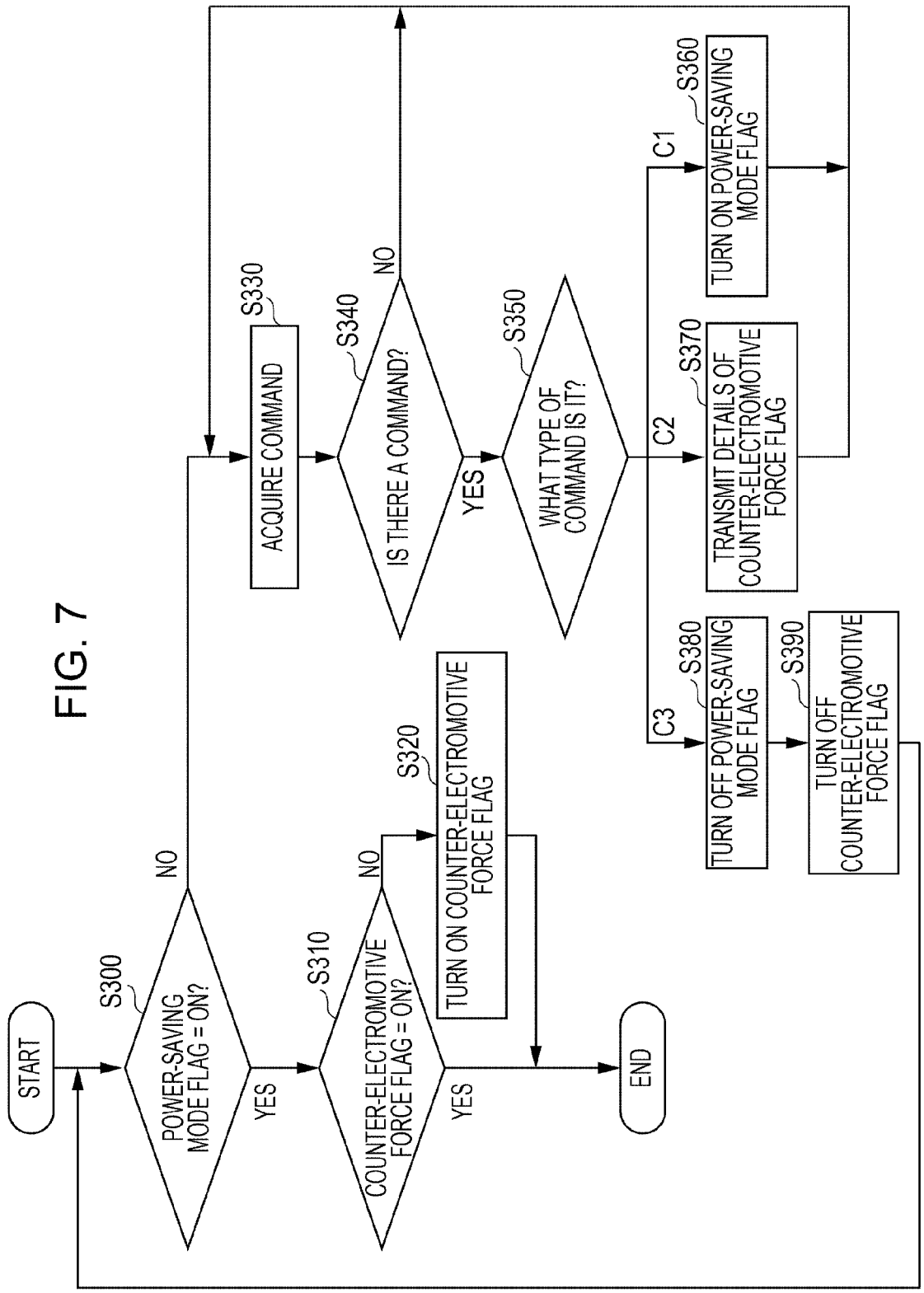
FIG. 7 is a flowchart illustrating a control process flow in a detection control unit.

FIG. 7 is a flowchart illustrating a control process flow in the detection control unit 80. This flow is a process flow in which a control program of the detection control unit 80 which is stored in the detection storage unit 83 is read in the detection control unit 80 and is executed and the functions of the detection processing unit 81 are realized.

In addition, this flow is executed should the operation of the detecting MCU 181 be started by the counter-electromotive force supplied from the detection unit 70 if the printer 1 is in the power-saving mode, or if the transition to the operation mode is performed in the printer 1 and power is supplied to the detecting MCU 181 from the main power supply unit 10. In the details of this flow, the process is divided into the case of the power-saving mode and the case of the operation mode.

First, an entire configuration of the flow is described. In step S300, it is determined whether the power-saving mode is performed or the operation mode is performed. In the case of the power-saving mode, the process of step S310 to step S320 is performed once and the process is ended. In the case of the operation mode, the process of step S330 to step S390 is repeatedly performed.

In step S300, it is determined whether or not a power-saving mode flag turns on. In a case where the power-saving mode flag is on (Yes in step S300), the printer 1 is in the power-saving mode and the process proceeds to step S310. In a case where the power-saving mode flag is not on (No in step S300), the printer 1 is in the operation mode and the process proceeds to step S330.

In step S310, it is determined whether or not the counter-electromotive force flag is on. In a case where the counter-electromotive force flag is on (Yes in step S310), the process is ended because at least one event of the counter-electromotive force has previously been generated and thus the flag is on. In a case where the counter-electromotive force flag is not on (No in step S310), the process proceeds to step S320.

In step S320, the counter-electromotive force flag turns on. Specifically, a bit of an identified address in which the counter-electromotive force flag of the nonvolatile memory area of the detection storage unit 83 is stored is changed from 0 to 1.

The execution of the control program is ended when each step of step S300 to step 320 is ended and the operation of the detecting MCU 181 is ended when the power supply to the detecting MCU 181 of the counter-electromotive force becomes lower than operation power.

In step S330, a command is acquired. Specifically, because of the case of the operation mode, power stabilized by the main power supply unit 10 is supplied to the respective units including the detecting MCU 181 and the main CPU 151 of the main controller 50. In step S330, a command is transmitted and received between the detection control unit 80 and the main controller 50 through the serial communication 99. In step S330, the detection control unit 80 has a buffer queue in which acquired commands are pooled in the detection storage unit 83 and the acquired commands are read in a chronological order in a time series.

In step S340, it is determined that there is a command. Specifically, in a case where a command transmitted from the main controller 50 exists in the buffer queue (Yes in step S340), the process proceeds to step S350 and the command is interpreted. In a case where no command exists (No in step S340), the process returns to step S330 and the printer enters a command acquisition waiting state.

In step S350, the type of command is determined. Specifically, the command transmitted from the main controller 50 is compared to a predefined command. The predefined commands include a power-saving mode setting C1, a counter-electromotive force flag transmitting request C2, and a reset execution C3 and the process proceeds to step S360, step S370, and step S380 in the order when the commands are compared and matched.

Here, the respective commands are described.

The power-saving mode setting C1 is a command indicating the transition to the power-saving mode is performed in the main controller 50. The command is transmitted in step S220 (FIG. 6).

The counter-electromotive force flag transmitting request C2 is a command for requesting the details of the counter-electromotive force flag such that the main controller 50 determines whether or not the counter-electromotive force is generated and is transmitted in step S150 (FIG. 5).

The reset execution C3 is a command for resetting a flag controlled in the detection control unit 80 such that the next counter-electromotive force is detected because the process required in the main controller 50 based on the details of the counter-electromotive force is ended and is transmitted in step S180 (FIG. 5).

In step S360, the power-saving mode flag turns on. Specifically, since the power-saving mode setting C1 is received from the main controller 50, the bit of the identified address in which the power-saving mode flag of the nonvolatile memory area of the detection storage unit 83 is stored is changed from 0 to 1. When step S360 is ended, the process proceeds to step S330 so as to acquire the next command.

In step S370, the details of the counter-electromotive force flag are transmitted. Specifically, the details of the counter-electromotive force flag (which are stored in the nonvolatile memory area of the detection storage unit 83) are read and are transmitted to the main controller 50. When step S370 is ended, the process proceeds to step S330 so as to acquire the next command.

In step S380, the power-saving mode flag turns off. Specifically, the bit of the identified address in which the power-saving mode flag of the nonvolatile memory area of the detection storage unit 83 is stored is set to 0. In step S390, the counter-electromotive force flag turns off. Specifically, the bit of the identified address in which the counter-electromotive force flag of the nonvolatile memory area of the detection storage unit 83 is stored is set to 0. When step S390 is ended, the process proceeds to step S300 and is repeated.

In this manner, the power is supplied to the detection control unit 80 from the main power supply unit 10 when the printer 1 is in the operation mode, the commands are transmitted and received between the main controller 50 and the detection control unit 80, and the process is performed in accordance with the commands. Accordingly, the detection control unit 80 is in an operation state due to the supply of the counter-electromotive force supplied from the detection unit 70 when the printer 1 is in the power-saving mode, the counter-electromotive force flag turns on, and the process is ended.

The start process flow of the operation mode in the main controller illustrated in FIG. 5, the start process flow of the power-saving mode in the main controller illustrated in FIG. 6, and the control process flow in the detection control unit illustrated in FIG. 7 correspond to printing methods.

As described above, the printer 1 according to the present embodiment can achieve the following effects.

In the case where the printing unit 20 (carriage 23) is moved when the printer 1 is in the power-saving mode, the detecting MCU 181 of the detection control unit 80 is started using the counter-electromotive force of the drive unit 60 (carriage motor 61) and the counter-electromotive force flag stored in the EEPROM 183 which is the nonvolatile memory turns on.

In addition, when the printer 1 is in the operation mode, the main controller 50 acquires, from the detection control unit 80, the details of the counter-electromotive force flag with which it can be determined whether or not the printing unit 20 has moved during the power-saving mode. Since the movement of the printing unit 20 is confirmed when the counter-electromotive force flag is on, the main controller 50 determines that the home-seek process is necessary and the home-seek process is performed. In a case where the counter-electromotive force flag is off, the home-seek process is not necessary and the home-seek process is not performed.

In the printer 1 of the present embodiment, it is determined whether or not the carriage has moved during the power-saving mode while the power consumption is suppressed. It is thus possible to perform the home-seek process in the case where the carriage has moved.

Hence, even in a case where the carriage is slightly moved by a user's manual operation during the power-saving mode, it is possible to perform the printing at the accurate position.

In addition, in the detection of the movement of the carriage, it is possible to perform the detection while saving power because the power supply of the main power supply unit is not used.

Embodiment 2

Next, Embodiment 2 will be described with reference to FIG. 8, mainly, and with reference to the drawings, appropriately.

Figure 8:
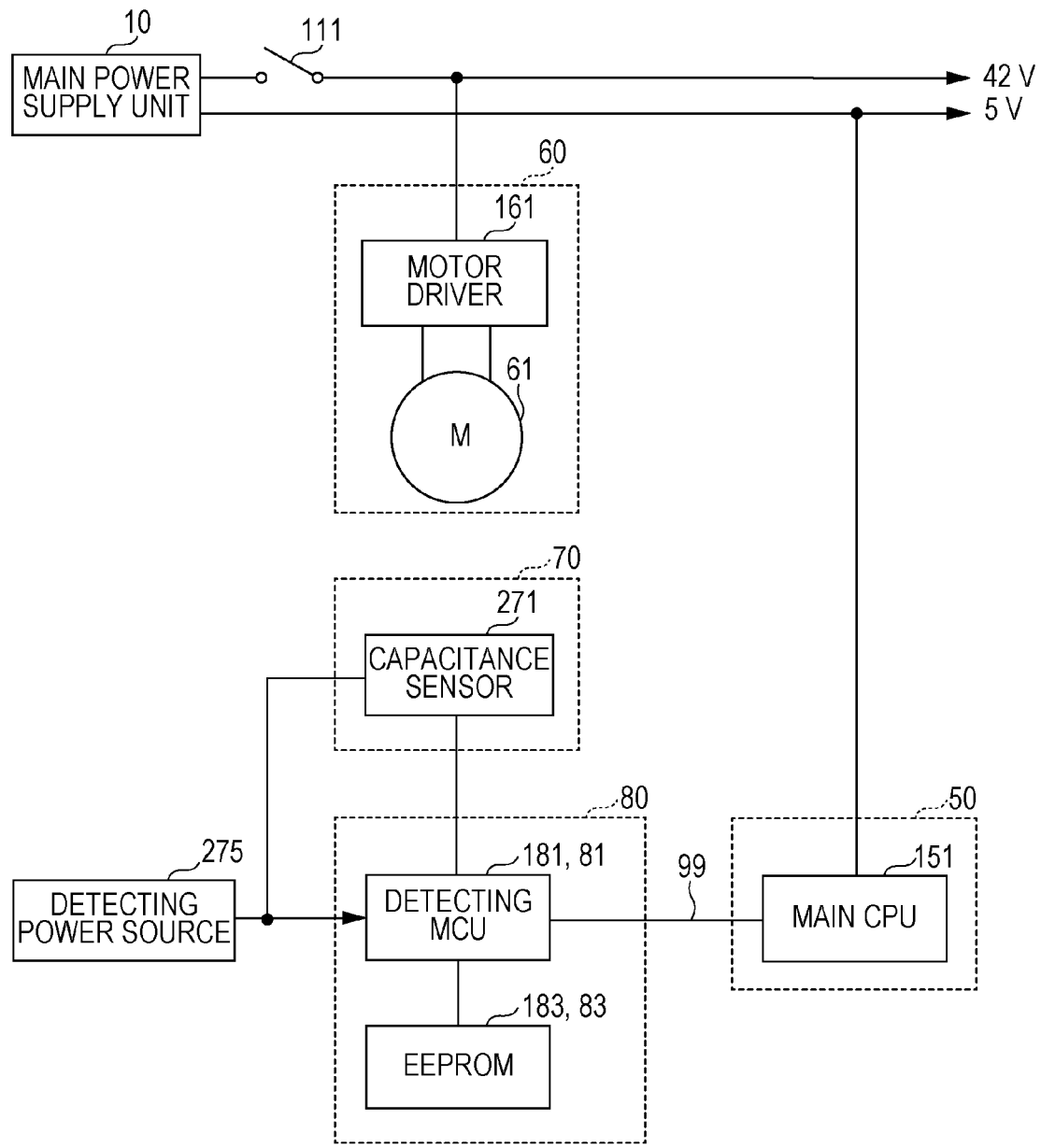
FIG. 8 is a circuit diagram schematically illustrating an example of a detection unit according to Embodiment 2.

FIG. 8 is a circuit diagram schematically illustrating an example of a detection unit according to Embodiment 2. In the present embodiment, the detection unit 70 is configured to have a capacitance sensor 271, unlike in Embodiment 1 in which the detection unit 70 of the printer 1 is configured to use the counter-electromotive force output from the carriage motor 61.

The present embodiment corresponds to a printing apparatus which includes a detection unit that detects a change in capacitance in the printing unit.

The main power supply unit 10, the switch 111, the main controller 50, the drive unit 60, the detection control unit 80, the serial communication 99, and the configurational units included in these units illustrated in FIG. 8 are in common with Embodiment 1 and the detection unit 70 and a detecting power source 275 are not included in Embodiment 1.

The detection unit 70 is configured to have the capacitance sensor 271.

The capacitance sensor 271 a known sensor in which a metal detection panel and a capacitor are embedded and which detects a capacitance change when a part of a human body such as a finger comes into contact therewith. The capacitance sensor 271 is disposed in the carriage 23 of the printing unit 20, the change in the capacitance is provoked when a user approaches or touches the carriage 23, and a change of a voltage is output to the detecting MCU 181.

The detecting power source 275 is a secondary cell or a primary cell with low power consumption which supplies power to the capacitance sensor 271 and the detection control unit 80 and is, for example, a lithium ion secondary cell or a lithium button cell.

In addition, instead of the counter-electromotive force flag (FIG. 5 to FIG. 7) which is controlled in the detection control unit 80 and the main controller 50 in Embodiment 1, a capacitance change flag is used and thereby, similar to Embodiment 1, the movement of the printing unit 20 is detected. The home-seek process is performed in a case where the movement of the printing unit 20 is detected and the home-seek process is not performed in a case where the movement is not detected. Such a method corresponds to a printing method in which it is determined that the change in the capacitance exists and the traveling operation of the printing unit is controlled.

According to the above configuration, the present embodiment can achieve the following effects in addition to the effects of Embodiment 1.

Since the detection can be performed in a state in which the user's finger or the like approaches the carriage 23, the detection can be reliably performed even during a delicate operation in which the carriage 23 is not moved far and the home-seek process can be performed. In addition, since the power source with the low power consumption is provided, the capacitance sensor 271 and the detecting MCU 181 can reliably stay in the operation state and it is possible to precisely detect the movement of the carriage 23.

The invention is not limited to the embodiments described above and various modifications or improvements of the embodiments described above can be performed. Hereinafter, modification examples are described.

Modification Example 1

The description is provided with reference to FIG. 4 and FIG. 8.

The embodiments described above have the configuration in which various types of information are transmitted and received through the commands between the main controller 50 and the detection control unit 80 using the serial communication 99; however, the invention is not limited to the configuration but may have a configuration in which various types of information are shared between a plurality of control units and a shared memory which is accessible is provided.

In the present modification example, a bus shared between the main CPU 151 and the detecting MCU 181 is disposed and the shared bus is connected to the nonvolatile memory. Information such as the counter-electromotive force flag or the power-saving mode flag indicating whether or not the power-saving mode is performed is stored in the nonvolatile memory. The main controller 50 reads a state in the power-saving mode flag and the detection control unit 80 reads and refers to the power-saving mode flag. In addition, the detection control unit 80 reads a state in the counter-electromotive force flag and the main controller 50 reads and refers to the counter-electromotive force flag.

According to the present example, since there is no need to transmit and receive the command by the serial communication 99, loads of execution processes in the main controller 50 an the detection control unit 80 are reduced and it is possible to share various types of information therebetween.

Modification Example 2

The embodiments and the modification examples described above have configurations in which the detection unit 70 detects the change in the counter-electromotive force of the drive unit 60 or in the capacitance of the printing unit 20; however, the invention is not limited to the configurations. For example, a configuration in which a sensor which detects that the user's operation is added to the lock lever 95, the lock-receiving portion 25 (FIG. 2), or the like is provided and the detection is performed by the detection unit 70 may be employed. In the configuration, the carriage 23 is more likely to move due to the operation of the lock lever 95 and the lock-receiving portion 25 and the same effects as in the embodiments and the modification examples described above are obtained.

Modification Example 3

The embodiments and the modification examples described above have the configuration in which the movement of the printing unit 20 is detected during the power-saving mode; however, a configuration in which the detection is performed during the power-off mode without being limited to the power-saving mode may be employed. Specifically, the detection unit 70 in the embodiments and the modification examples described above can determine whether or not the printing unit 20 is moved even during the power-off mode. In the transition process from the power-off mode to the operation mode, it is possible to omit the home-seek process when the printing unit 20 is not moved.

In this configuration, it is possible to shorten start process time of the printer 1 since the power turns on from the power-off mode.

Modification Example 4

The following description is provided with reference to FIG. 4.

The embodiments and the modification examples described above have the configuration in which the capacitor which accumulates a charge is provided between the DC-DC convertor 175 that configures the detection unit 70 and the detection control unit 80. In this configuration, the counter-electromotive force output from the drive unit 60 is accumulated and the power is supplied to the detecting MCU 181 at a timing at which sufficient power is accumulated such that the detecting MCU 181 is started and the process is performed by the detection control unit 80. In this configuration, it is possible to stabilize the detecting MCU 181 and to achieve the operation state.

What is claimed is:

1. A printing apparatus comprising:
   a printing unit that performs printing on a printing medium;
   a drive unit that causes the printing unit to move;
   a power supply unit that supplies power to the drive unit;
   a detection unit that detects the movement of the printing unit; and
   a controller that controls an initialization operation related to the printing unit based on a detection result of the detection unit,
   wherein, when power supply from the power supply unit to the drive unit is started, the controller acquires the detection result obtained when power is not supplied, performs the initialization operation in a case where movement of the printing unit is detected in the detection result, and does not perform the initialization operation in a case where movement of the printing unit is not detected in the detection result.

2. The printing apparatus according to claim 1,
   wherein the drive unit has a motor that causes the printing unit to move and the detection unit detects the movement based on an electromotive force generated in the motor.

3. The printing apparatus according to claim 1,
   wherein the detection unit has a capacitor that accumulates the electromotive force and is driven by power supplied from the capacitor.

4. A printing apparatus comprising:
   a printing unit that performs printing on a printing medium;
   a drive unit that causes the printing unit to move;
   a power supply unit that supplies power to the drive unit;
   a detection unit that detects a change in capacitance of the printing unit; and
   a controller that controls an initialization operation related to the printing unit based on a detection result of the detection unit,
   wherein, when power supply from the power supply unit to the drive unit is started, the controller acquires the detection result obtained when power is not supplied, performs the initialization operation in a case where a change in the capacitance is detected in the detection result, and does not perform the initialization operation in a case where a change in the capacitance is not detected in the detection result.

5. A printing method in which a movement operation of a printing unit that moves and performs printing on a printing medium is controlled, the printing method comprising:
   detecting whether an electromotive force is generated in a drive unit due to movement in the printing unit; and
   performing an initialization operation related to the movement operation of the printing unit in a case where the generation of electromotive force is detected in the detected result, and performing no initialization operation in a case where the generation of electromotive force is not detected in the detected result.

6. A printing method in which a movement operation of a printing unit that moves and performs printing on a printing medium is controlled, the printing method comprising:
   detecting whether capacitance of the printing unit has changed; and
   performing an initialization operation related to the movement operation of the printing unit in a case where the a change in the capacitance is detected in the detected result, and performing no initialization operation in a case where a change in capacitance is not detected in the detected result.

* * * * *